United States Patent [19]

Fishback

[11] Patent Number: 4,499,990
[45] Date of Patent: Feb. 19, 1985

[54] APPARATUS FOR IMPARTING ANGULAR MOVEMENT TO ARTICLES WHILE BEING MOVED ALONG A PREDETERMINED PATH

[75] Inventor: Alton J. Fishback, Austell, Ga.
[73] Assignee: The Mead Corporation, Dayton, Ohio
[21] Appl. No.: 491,176
[22] Filed: May 3, 1983
[51] Int. Cl.³ .............................................. B65G 47/24
[52] U.S. Cl. ..................................... 198/411; 198/415
[58] Field of Search ................ 198/411, 412, 415, 457

[56] References Cited
U.S. PATENT DOCUMENTS

| | | | |
|---|---|---|---|
| 2,184,376 | 11/1957 | Hood | 198/411 |
| 3,165,193 | 1/1965 | Stevenson, Jr. | 198/415 |
| 3,306,424 | 2/1967 | Fahrenbach | 198/415 |
| 3,462,001 | 8/1969 | Boyce | 198/415 |

Primary Examiner—Joseph E. Valenza
Assistant Examiner—Michael Stone
Attorney, Agent, or Firm—Rodgers & Rodgers

[57] ABSTRACT

Article rotating apparatus includes an endless element having a working reach movable alongside the path of movement of the articles and having a curvilinear reach forming a continuation of the downstream part of the working reach and extending in a direction away from the path of movement of the articles, and an article engaging lug mounted on the endless element and engageable with an article for imparting angular movement thereto while being moved along the curvilinear reach of the endless element.

13 Claims, 4 Drawing Figures

APPARATUS FOR IMPARTING ANGULAR MOVEMENT TO ARTICLES WHILE BEING MOVED ALONG A PREDETERMINED PATH

TECHNICAL FIELD

This invention relates to apparatus for imparting rotary movement to articles forming a single row of articles while such articles are being moved along a predetermined path.

BACKGROUND ART

U.S. patent application Ser. No. 475,522 filed Mar. 15, 1983 discloses apparatus for arranging articles in groups and includes an infeed portion in which articles arranged in a single row in following relation are manipulated transversely so as to form two rows of articles which are then accumulated in groups during movement of the articles through the outfeed end of the machine.

DISCLOSURE OF THE INVENTION

According to this invention in one form, apparatus for imparting angular movement to articles which are moved along a predetermined path in a single row comprises an endless element having a working reach movable alongside said predetermined path and having a curvilinear reach forming a continuation of the downstream part of said working reach and extending in a direction away from said predetermined path together with at least one article engaging lug mounted on said endless element and engageable with articles in sequence for imparting angular movement thereto while said lug is moved along said curvilinear reach of said endless element. Unlike patent application Ser. No. 475,522, the articles are not arranged in two rows while being moved through the outfeed portion of the machine.

BEST MODE OF CARRYING OUT THE INVENTION

Figure 1:
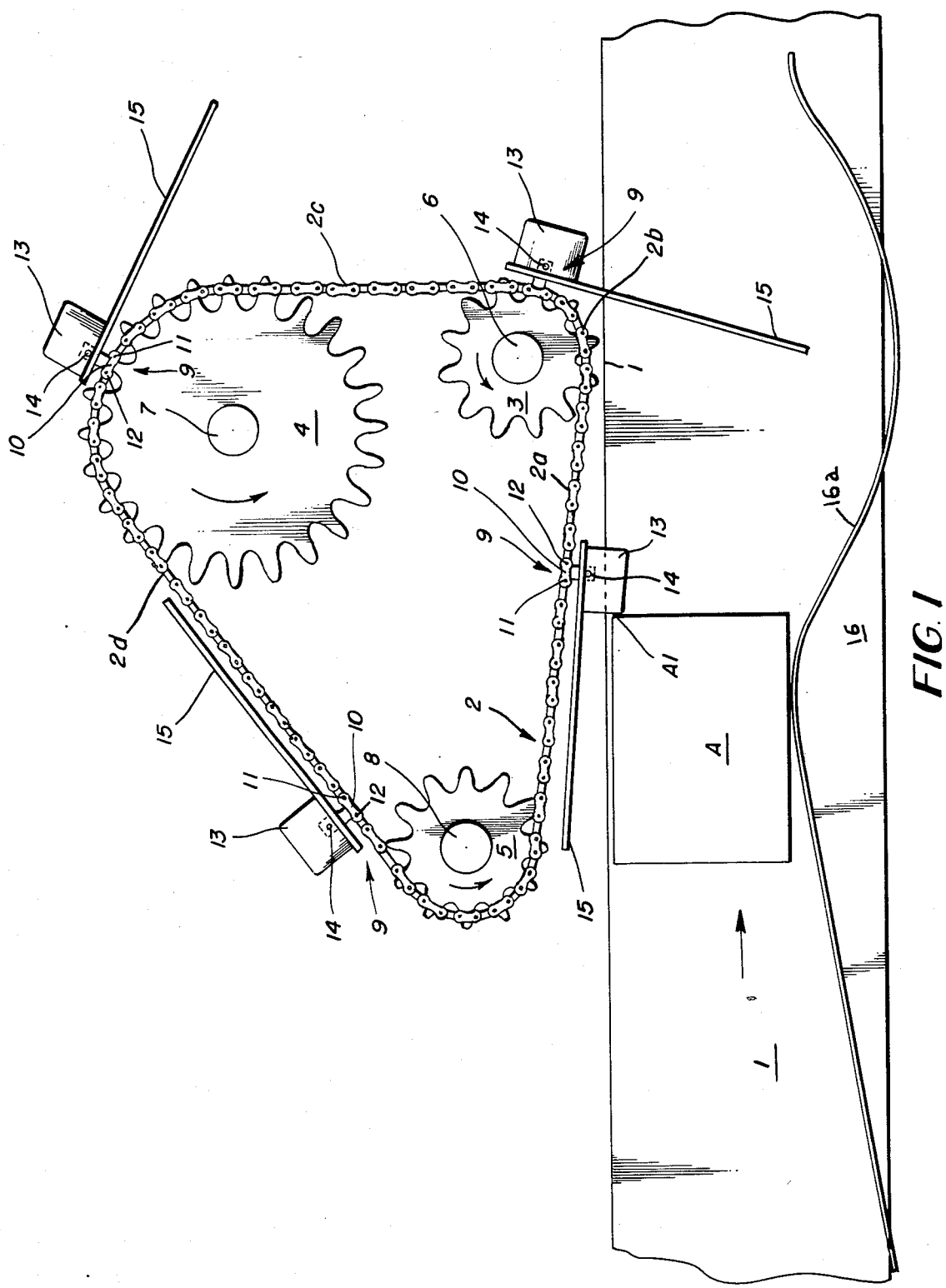
FIG. 1 is a schematic plan view of the portions of a packaging machine which are formed according to this invention and which are for the purpose of imparting rotation to articles while such articles are being moved along a predetermined path, the parts being shown in the positions which they occupy at the point of initial contact between an article and the apparatus formed according to this invention.

In the drawings the numeral 1 represents an endless conveyor which serves as a means for conveying a plurality of articles in following relation from left to right through a packaging machine. An article is designated at "A". An endless element 2 such as a chain is trained about a driving sprocket 3 and a pair of driven sprockets 4 and 5. Sprockets 3, 4 and 5 are mounted on and are rotatable with their associated shafts 6, 7 and 8 which are vertically disposed and which are mounted on the frame of the machine (not shown).

For the purpose of engaging articles such as "A", a lug generally indicated by the numeral 9 includes a mounting bracket 10 mounted to chain 2 by pins 11 and 12. Base portion 13 of lug structure 9 is rigidly secured to the mounting bracket 10 by means of pin 14 and an elongated extension 15 is rigidly secured to the lug structure 9 by any suitable means such as by welding.

In order to insure that articles such as "A" are maintained in firm contact with the lug structure 9, the conveyor 1 is driven at a slightly faster speed than the speed of movement of the lug 9 in the direction of conveyor 1.

Endless element 2 comprises a straight working reach designated 2a which extends alongside the path of movement of the articles "A" and between the sprockets 3 and 5. From the drawings it is apparent that the working reach 2a of endless element 2 is disposed in an angular converging relation to the conveyor 1 and to the path of movement of articles "A". A curvilinear reach 2b forms a continuation of the downstream part of working reach 2a and the shape of such curvilinear portion is determined by sprocket 3 and as represented constitutes a portion of the circumference of a circle. Endless element 2 also includes a straight withdrawal reach 2c which extends between sprockets 3 and 4 and which is disposed in substantially normal or perpendicular relation to the direction of movement of the working reach of conveyor 1 and to the path of movement of containers "A". Similarly endless element 2 includes a return reach 2d which extends between reaches 2a and 2c.

Figure 2:
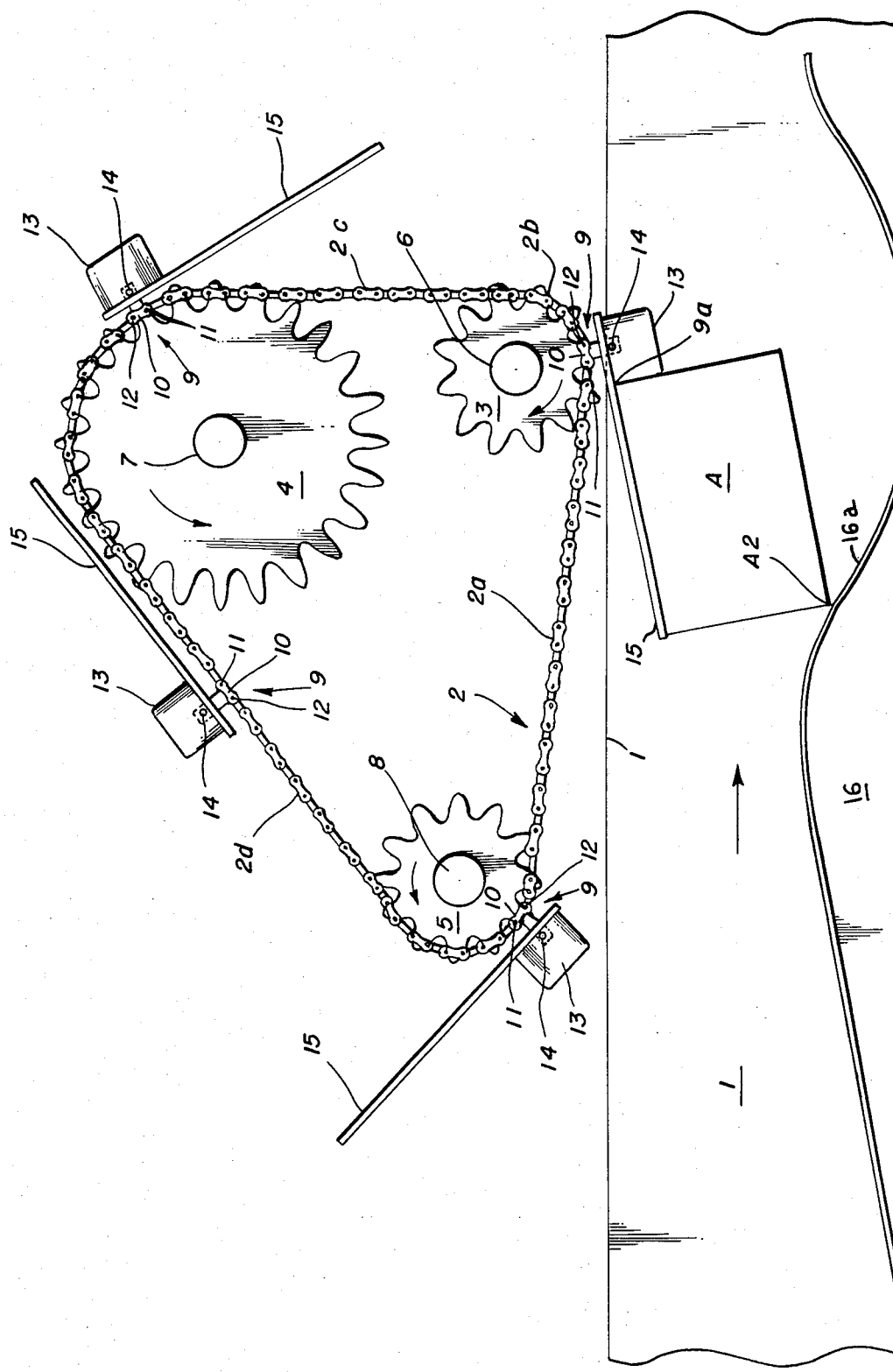
FIG. 2 is a view similar to FIG. 1 but shows the parts in the positions which they occupy during a subsequent stage of angular movement of the articles.

As is obvious from a comparison of FIGS. 1 and 2, the angular converging relation of the working reach 2a relative to the direction of movement of the working reach of conveyor 1 results in engagement of the corner A1 of container "A" with the corner 9a of lug 9 as is represented in FIG. 2. Furthermore FIG. 2 depicts an instant in the angular movement of article "A" in a counterclockwise direction about a vertical axis due to movement of lug 9 about a portion of the curvilinear portion 2b of endless element 2.

Figure 3:
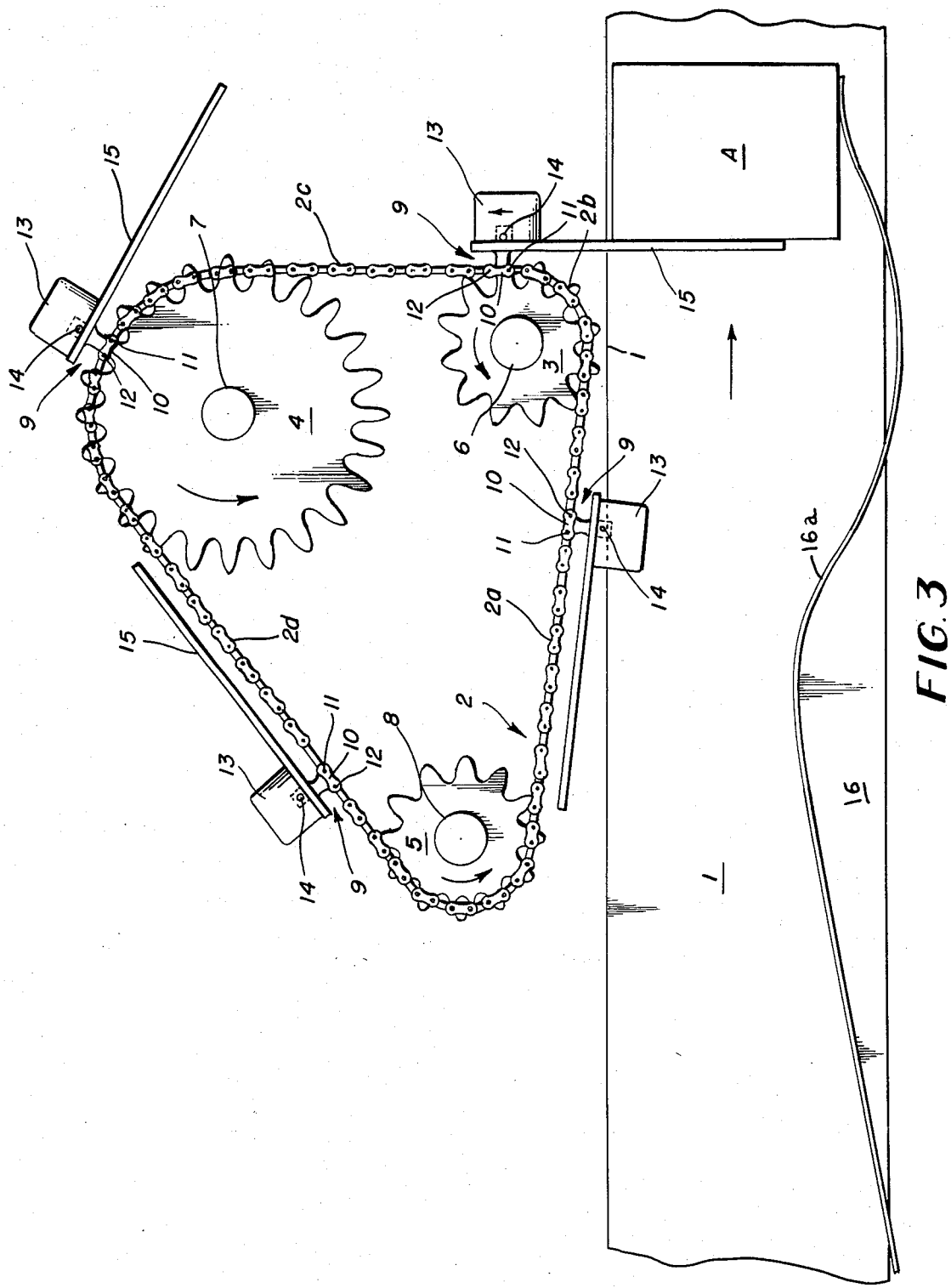
FIG. 3 is a view similar to FIGS. 1 and 2 and shows the parts in the positions which they occupy upon completion of rotation of an article through an angle of approximately ninety degrees.

For preventing undesired movement of container A in a direction away from the base portion 12 of lug 9, guide means 16 is provided and is configured with a curved circular portion 16a for engaging the corner A2 of article "A". Arcuate portion 16a is in the form of a part of a circle having a center at the center of shaft 6 since it is about this center that the article A is manipulated by lug structure 9. After the operation progresses to the condition represented in FIG. 3 rotation of article "A" through an angle of approximately ninety degrees is complete. Thereafter lug structure 9 moves in a direction transverse to and generally normal or perpendicular to the path of movement of the working reach of conveyor 1 so that there is no tendency to impart accelerated movement of container "A" in a direction from left to right as would be the case if extension 15 were rigidly secured to some rotary element such as sprocket 3.

Figure 4:
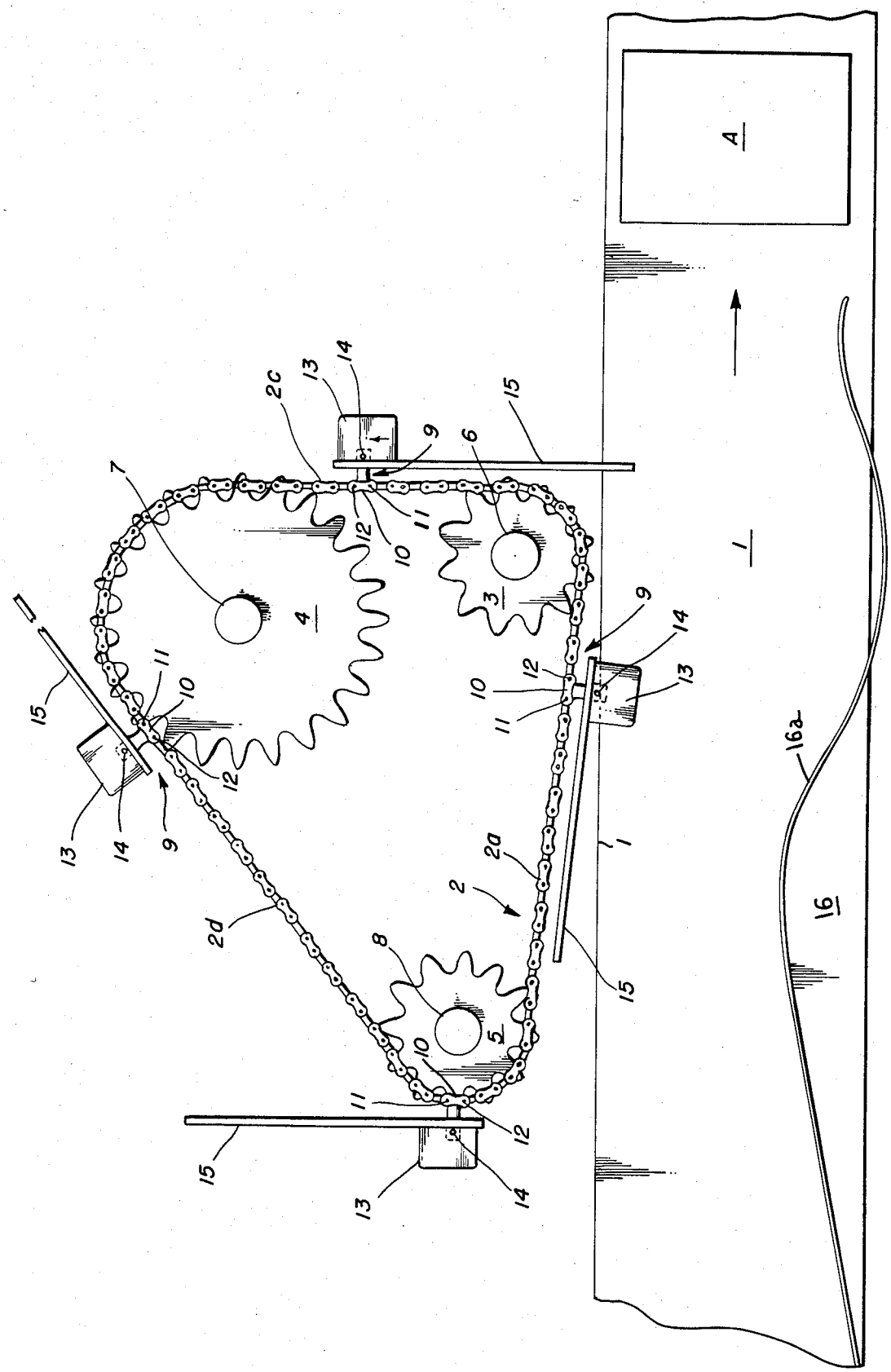
FIG. 4 shows the parts in the positions which they occupy after a rotated container is moved out of engagement with the apparatus of this invention by conveyor means which moves the article along a predetermined path.

Continued movement of conveyor 1 causes container "A" to move out of engagement with the extension 15 of lug 9 and rotation of the container "A" is thus complete as represented by the structure shown in FIG. 4.

As is explained in U.S. application Ser. No. 475,522, articles "A" after having been rotated may be accumulated in an appropriate fashion in the outfeed portion of the machine and may then be packaged so that a plurality of containers "A" are enveloped within a single unitary package although the apparatus of this invention does not contemplate arranging the articles such as "A" in two rows in the outfeed portion of the machine as is contemplated by U.S. application Ser. No. 475,522.

INDUSTRIAL APPLICABILITY

This invention is well suited for use in conjunction with packaging machines which are designated to package a plurality of articles in a single package unit and especially articles which are of cubical configuration.

I claim:

1. Apparatus for imparting angular movement to an article having substantially vertical angularly related sides while the article is being moved along a predetermined path, said apparatus comprising an endless element having a working reach movable alongside said predetermined path in angularly disposed converging relation thereto at a velocity somewhat less than the velocity of movement of the articles and having a curvilinear reach forming a continuation of the downstream part of said working reach and extending in a direction away from said predetermined path, and at least one article engaging lug mounted on said endless element and engageable with an article for imparting angular movement thereto while said lug is moved along said curvilinear reach of said endless element.

2. Apparatus according to claim 1 wherein guide means is fixed in position and disposed alongside said predetermined path and opposite said working reach of said endless element for engaging the article so as to prevent undesired movement of the article in a direction transverse to said path of movement.

3. Apparatus according to claim 1 wherein the article is of cubical configuration and said curvilinear reach is configured to coincide with a part of the circumference of a circle.

4. Apparatus according to claim 3 wherein said endless element comprises an endless chain and wherein said curvilinear reach is defined by a sprocket.

5. Apparatus according to claim 1 wherein a withdrawal reach forms a continuation of said curvilinear reach and wherein said withdrawal reach is disposed in a substantially normal angular relation to said predetermined path.

6. Apparatus according to claim 5 wherein a return reach of said endless element interconnects said withdrawal and said working reaches.

7. Apparatus according to claim 1 wherein a plurality of articles are moved along said predetermined path in timed relation one behind another in a single row.

8. Apparatus according to claim 1 wherein a plurality of lugs are mounted on said endless element in spaced relation to each other.

9. Apparatus according to claim 1 wherein said lug comprises a base portion secured at two mounting points to said endless element.

10. Apparatus according to claim 9 wherein said lug comprises an elongated extension fixedly secured to said base portion.

11. Apparatus according to claim 1 wherein the article is of cubical configuration and is rotated through an angle of approximately ninety degrees about a substantially vertical axis by angular movement of said lug.

12. Apparatus for imparting angular movement to an article having substantially vertical angularly related sides while the article is being moved along a predetermined path, said apparatus comprising an endless element having a working reach movable alongside said predetermined path and having a curvilinear reach forming a continuation of the downstream part of said working reach and extending in a direction away from said predetermined path, and at least one article engaging lug having a base portion mounted on and secured to said endless element at two mounting points and having an elongated extension fixedly secured to said base portion, said base portion and said elongated extension defining a corner structure which is disposed to receive a corner of the article for imparting angular movement thereto while said lug is moved along said curvilinear reach of said endless element.

13. Apparatus for imparting angular movement to an article having substantially vertical angularly related sides while the article is being moved along a predetermined path, said apparatus comprising an endless element having a working reach movable alongside said predetermined path and having a curvilinear reach forming a continuation of the downstream part of said working reach and extending in a direction away from said predetermined path, and at least one article engaging lug mounted on said endless element and engageable with an article for imparting angular movement thereto while said lug is moved along said curvilinear reach of said endless element, said article being moved along said predetermined path at a velocity which is somewhat greater than the velocity of the component of movement of said lug along said working reach of said endless element in the direction of said predetermined path.

* * * * *